(12) United States Patent
Pisal et al.

(10) Patent No.: US 11,409,511 B2
(45) Date of Patent: Aug. 9, 2022

(54) METHOD AND SYSTEM FOR DOWNLOADING INFORMATION

(71) Applicant: Beijing DiDi Infinity Technology and Development Co., Ltd., Beijing (CN)

(72) Inventors: Mahesh Pisal, Mountain View, CA (US); Qingdi Liu, Mountain View, CA (US); Chandrasekhar Rentachintala, Mountain View, CA (US); Shengyong Deng, Mountain View, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 126 days.

(21) Appl. No.: 16/236,986

(22) Filed: Dec. 31, 2018

(65) Prior Publication Data

US 2020/0210165 A1 Jul. 2, 2020

(51) Int. Cl.
| | |
|---|---|
| *G06F 15/173* | (2006.01) |
| *G06F 8/65* | (2018.01) |
| *G06F 8/61* | (2018.01) |
| *H04L 9/40* | (2022.01) |
| *H04L 47/25* | (2022.01) |
| *H04L 67/00* | (2022.01) |
| *H04L 67/60* | (2022.01) |

(52) U.S. Cl.
CPC ............... *G06F 8/65* (2013.01); *G06F 8/61* (2013.01); *H04L 47/25* (2013.01); *H04L 63/10* (2013.01); *H04L 63/308* (2013.01); *H04L 67/32* (2013.01); *H04L 67/34* (2013.01)

(58) Field of Classification Search
CPC ..... G06F 8/60; G06F 8/61; H04L 47/25; H04L 67/32; H04L 63/10; H04L 63/308
See application file for complete search history.

(56) References Cited

U.S. PATENT DOCUMENTS 8,271,641 B2* 9/2012 Fry ..................... H04L 67/1012
 709/224
8,316,123 B2* 11/2012 Sethuraman ............ H04L 67/34
 709/224

(Continued)

OTHER PUBLICATIONS

PCT/US2018/068158, "International Search Report and Written Opinion", dated Apr. 12, 2019, 10 pages.

*Primary Examiner* — Lewis A Bullock, Jr.
*Assistant Examiner* — Mohammad H Kabir
(74) *Attorney, Agent, or Firm* — Kilpatrick Townsend & Stockton LLP

(57) ABSTRACT

Methods and systems for downloading software information are disclosed herein. In one example embodiment, the method includes performing a first determination as to whether a first number of inquiries or download requests received by a server computer is or has been excessive and, if the first determination is that the first number of inquiries or download requests is not or has not been excessive, sending a signal including a first permission to download a software package. Also, the method includes performing a second determination as to whether either the first number or a second number of inquiries or download requests received by the server computer is or has been excessive and, if the second determination is that the first or second number of inquiries or download requests is not or has not been excessive, sending a first part of the software package for receipt by a first client computer.

19 Claims, 3 Drawing Sheets

(56) References Cited

U.S. PATENT DOCUMENTS

| | | |
|---|---|---|
| 2006/0271926 A1 | 11/2006 | Hutton et al. |
| 2007/0118530 A1 | 5/2007 | Chow et al. |
| 2007/0118653 A1 | 5/2007 | Bindal |
| 2012/0233306 A1* | 9/2012 | Ruppert ............... G07F 17/323 709/223 |
| 2012/0239798 A1* | 9/2012 | Cudd .................. G06F 11/302 709/224 |
| 2014/0344804 A1* | 11/2014 | Ein-Gal .................. G06F 8/61 717/178 |
| 2015/0271247 A1* | 9/2015 | Patsiokas ............... H04L 69/14 709/217 |
| 2016/0210596 A1* | 7/2016 | Xu ......................... H04L 63/10 |
| 2018/0323993 A1 | 11/2018 | Ansari et al. |

* cited by examiner

METHOD AND SYSTEM FOR DOWNLOADING INFORMATION

CROSS-REFERENCE TO RELATED APPLICATIONS

--

STATEMENT REGARDING FEDERALLY SPONSORED RESEARCH OR DEVELOPMENT

--

FIELD

The present disclosure relates to methods and systems for communicating information between or among computer systems and, more particularly, to the downloading of information from one computer system to one or more other computer systems.

BACKGROUND

Software updates are a common and often routine event for many computer systems that may be the recipients or targets of such updates. Indeed, many personal computers, mobile devices, client computer systems, or other update-receiving computer systems have implemented thereon a variety of types of software, such as application software and operating system software, for which updates can become available. To maintain or enhance performance, or to achieve one or more other objectives, installation of such updates can be desirable or even critical to the operation of these update-receiving computer systems.

Often, software updates are provided and downloaded from update-providing computer systems such as server computers. Depending upon the embodiment, software updates from such update-providing computer systems can become available and downloaded on one-off, occasional, frequent, or regular bases. In some cases, these updates are provided from the update-providing computer systems to large numbers (e.g., thousands or even tens of thousands) of update-receiving computer systems. Also, in some cases, a given update-receiving computer system can initiate the updating process or even self-upgrade automatically, for example, if that computer system is notified or becomes aware of the availability of a new upgrade or release.

In some arrangements, a first step in the overall process of updating or upgrading an update-receiving computer system is to download a release package or installer package. However, installer packages are becoming larger as more features become included and, in some circumstances, the bandwidth available for facilitating the communication of an installer package from an update-providing computer system to one or more (and frequently many) update-receiving computer systems is limited. Indeed, in some circumstances, network connections available for such an installer package to be communicated to the update-receiving computer system(s) are insufficiently stable to allow those computer system(s) to download an entire installer package within a given time.

Therefore, it would be advantageous if one or more new or improved methods or systems for communicating or downloading software update information or other information could be developed that largely or entirely overcame one or more of the aforementioned limitations associated with conventional downloading methods or systems, and/or avoided or overcame one or more other disadvantages, and/or provided one or more other advantages.

SUMMARY

In at least one example embodiment encompassed herein, the present disclosure relates to a method of downloading software information. The method includes receiving, at a server computer, a first signal arriving at least indirectly from a first client computer, where the first signal concerns a first inquiry as to whether a software package is available to be downloaded. Also, the method includes performing a first determination as to whether a first number of inquiries or download requests received by the server computer from a plurality of client computers including the first client computer is or has been excessive and, if the first determination is that the first number of inquiries or download requests is not or has not been excessive, sending a second signal for receipt by the first client computer including a first permission to download the software package. Further, the method includes receiving, at the server, a third signal arriving at least indirectly from the first client computer, the third signal including a first request that the software package be downloaded. Additionally, the method includes performing a second determination as to whether either the first number or a second number of inquiries or download requests received by the server computer from the plurality of client computers including the first client computer is or has been excessive and, if the second determination is that the first or second number of inquiries or download requests is not or has not been excessive, sending a first part of the software package for receipt by the first client computer, whereby, due to the performing of the first and second determinations, double-gated control is exercised in relation to the downloading of the software information including the first part of the software package.

In at least one additional example embodiment encompassed herein, the present disclosure relates to a method of downloading software information. The method includes receiving, at a server computer, a first signal arriving at least indirectly from a first client computer, where the first signal concerns a first inquiry as to whether a software package is available to be downloaded. Also, the method includes performing a first determination as to whether a first number of inquiries or download requests received by the server computer from a plurality of client computers including the first client computer is or has been excessive. Further, the method includes, if the first determination is that the first number of inquiries or download requests is not or has not been excessive, sending a second signal for receipt by the first client computer including a first permission to download the software package. Also, the method includes receiving, at the server, a third signal arriving at least indirectly from the first client computer, the third signal including a first request that the software package be downloaded. Additionally, the method includes performing a second determination as to whether either the first number or a second number of inquiries or download requests received by the server computer from the plurality of client computers including the first client computer is or has been excessive. Also, the method includes, if the second determination is that the first or second number of inquiries or download requests is not or has not been excessive, sending a first part of the software package for receipt by the first client computer, whereby, due to the performing of the first and second determinations, double-gated control is exercised in relation to the downloading of the software information including the first part of the software package.

In at least one further example embodiment encompassed herein, the present disclosure relates to a system for downloading software information. The system includes a server computer comprising at least one processing device and at least one memory device coupled at least indirectly with the at least one processing device. The server computer is configured to receive a first signal arriving at least indirectly from a first client computer, where the first signal concerns a first inquiry as to whether a software package is available to be downloaded. Also, the server computer is configured to perform a first determination as to whether a first number of inquiries or download requests received from a plurality of client computers including the first client computer is or has been excessive and, if the first determination is that the first number of inquiries or download requests is not or has not been excessive, send a second signal for receipt by the first client computer including a first permission to download the software package. The server computer also is configured to receive a third signal arriving at least indirectly from the first client computer, the third signal including a first request that the software package be downloaded. The server computer also is configured to perform a second determination as to whether either the first number or a second number of inquiries or download requests received from the plurality of client computers including the first client computer is or has been excessive and, if the second determination is that the first or second number of inquiries or download requests is not or has not been excessive, send a first part of the software package for receipt by the first client computer, whereby, due to the performing of the first and second determinations, double-gated control is exercised in relation to the downloading of the software information including the first part of the software package.

DETAILED DESCRIPTION

Figure 1:
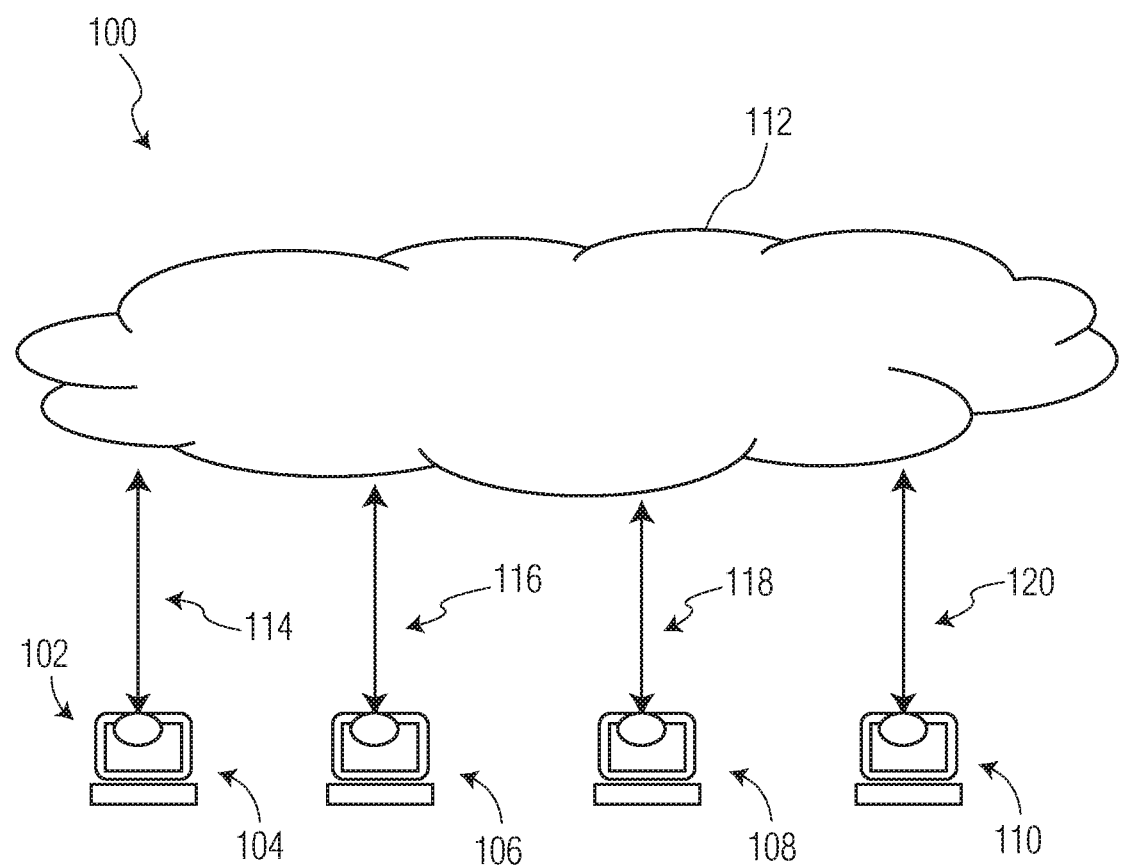
FIG. 1 is a schematic diagram showing an example computer system that can perform one or more improved methods of downloading software update information, in accordance with an example embodiment encompassed herein.

The present disclosure relates to improved methods and systems for downloading software update information (and possibly other software or other information or data) from one or more computers such as server computers to one or more (and typically more than one) other computers such as client computers. Such improved methods and systems can be applicable to any of a variety of contexts involving any of a variety of types of computer systems and/or software updates or other information. For example, in some embodiments that involve security operations centers, agent software (or simply agents) can be deployed to many (e.g., tens of thousands of) computers (or computerized devices or computer systems).

In an example embodiment encompassed by the present disclosure, an improved method first entails splitting a new release (or release package) into multiple parts when it is generated and becomes available on a server computer (or other update-providing computer system). The new release can particularly be divided into parts in a manner that each respective part is small enough to permit and/or facilitate the successful downloading of each of the parts (or at least one or more of the parts) in slow connection environments. With pre-split packages, it is also possible to support caching more effectively.

Additionally in such an example embodiment, the improved method also includes an agent self-upgrade subprocess (or process flow). In accordance with this subprocess, an agent first contacts the server computer to check if a new release (e.g., new software update or installation package) is available at the server and, in response, the server returns information regarding the new release so long as the server has not received too many download requests (e.g., download requests from too many different agents). Assuming both that a new release is available and the server returns the information concerning the new release to the requesting agent, an additional subprocess is performed. In accordance with this second subprocess, the server sends parts of the new release in succession to the requesting agent, again so long as the server has not received too many download requests (e.g., download requests from too many agents). After all parts are successfully downloaded, the agent will combine the parts into one package and start the installation process by which the new release is installed on the agent.

By virtue of the two subprocesses described above, the improved method in this example embodiment operates in a manner that can be described as involving double-gated rate limit control. This can be particularly effective during new release deployment, because package downloading will take most of the bandwidth on the server side. Indeed, in this example embodiment, each of the above-described first subprocess and second subprocess contribute to avoiding a bottleneck in terms of the downloading of a new release. More particularly, the first subprocess described above serves as a gatekeeper for issuing download permissions, and thereby restricts the agent(s) which can proceed with any downloading activity (in accordance with the second subprocess) to those of the agent(s) which have received appropriate download permission(s). By avoiding the granting of too many download permissions, overcommitments in terms of the allocation of bandwidth can be avoided.

Further, the second subprocess described above, which relates to the sending of parts of the new release from the server to an agent, controls the download rate and bandwidth usage as downloading is proceeding with respect to one or more (and often many) agents. The second subprocess can act as a second gatekeeper for executing the download, on two levels. First, if it is determined at any time during downloading that too many download requests have arisen (even if all of the requests are from agents that have been issued permissions in accordance with the first subprocess) then downloading can cease or be deferred. Second, if it is determined at any time during downloading that too many download requests have arisen, the server computer can also cause the first subprocess to stop issuing additional permissions. Then, after agents with permission have finished the downloading of all parts of the new release, the server computer can allow the issuance of new permissions in accordance with the first subprocess to be restarted.

Referring to FIG. 1, a schematic diagram is provided to show an example computer system 100 that can perform one or more improved methods of downloading software update information in accordance with embodiments encompassed herein. As illustrated, in FIG. 1 the computer system 100 includes a set of client computers 102, which in the present example is shown to include first, second, third, and fourth client computers 104, 106, 108, and 110. Additionally, the computer system 100 further includes a server computer 112. Further as illustrated, each of the first, second, third, and fourth client computers 104, 106, 108, and 110 is coupled to, and configured for communications with, the server computer 112 by way of first, second, third, and fourth communication links 114, 116, 118, and 120, respectively. Correspondingly, the server computer 112 is coupled to, and configured for communications with, each of the first, second, third, and fourth client computers 104, 106, 108, and 110 via the communication links 114, 116, 118, and 120, respectively.

In the present embodiment, the computer system 100 particularly can be considered a security operations center (SOC) computer system. Although the server computer 112 is illustrated in FIG. 1 as one structure, it should be understood that the server computer 112 also can include or take the form of one or more server computers (e.g., multiple computers or a distributed system). As will be described in further detail, the server computer (or server computers) 112 can include software or programming allowing the server computer to serve both as a security operations system and also to have a security agent backend server. Further, each of the first, second, third, and fourth client computers 104, 106, 108, and 110 can be agent computers that each include security agent software or programming. Such agent computers can also be considered or referred to as endpoint devices.

In view of the above description, it will be appreciated that the computer system 100 takes the form of a client-server system in which the client computers 104, 106, 108, and 110 are coupled to and in communication with the server computer 112. Each of the first, second, third, and fourth client computers 104, 106, 108, and 110 are each respectively configured to engage in communications with the server computer 112 in which the respective client computers contact the server computer 112 to obtain information, data, or services, and the server computer can respond to those requests, including by providing information, data, or services to the respective client computers making the respective requests.

Additionally in the present embodiment, the communication links 114, 116, 118, and 120 can be understood to encompass any one or more wireless or wired communication links. In at least some embodiments, the communication links 114 116, 118, and 120 can be part of an intranet or private network, or representative of propriety communication links. Also, in other embodiments, the communication links 114, 116, 118, and 120 can be part of the Internet (or, alternatively, the World Wide Web). Further, the communication links 114, 116, 118, and 120 are intended to be representative of, or can be replaced by, any of a variety of networks, communication links, or associated technologies including, for example, a cellular network, a local area network (LAN), a wide area network (WAN), a wireless local area network (WLAN), Wi-Fi communication links or access points, a metropolitan area network (MAN), a public telephone switched network (PSTN), a Bluetooth network, a ZigBee network, a near field communication (NFC) network, a cable network, a wireline network, an optical fiber network, a telecommunications network or the like, or any combination thereof.

In the present embodiment, and as discussed in further detail below, the server computer 112 particularly can provide programming or software updates to the first, second, third, and fourth client computers 104, 106, 108, and 110 in response to requests from those client computers. Such software updates can update, or provide modifications to, one or more types of programming or software residing or operating on one or more of the client computers 104, 106, 108, and 110 including, for example, applications, operating system(s), or firmware. Although a software update can be provided in a one-off manner, for purposes of the present disclosure it is also envisioned that software updates will become available, and can be provided, from the server computer 112 on occasional, recurring, periodic, or regular bases.

Although the set of client computers 102 shown in FIG. 1 includes the four client computers 104, 106, 108, and 110, this number of client computers is merely an example. In other embodiments encompassed herein, any other arbitrary number of client computers can be coupled to or in communication with the server computer 112 including, for example, one, two, or three client computers, or more than four client computers. Indeed, the present disclosure envisions that, in many embodiments (or arrangements), there will be hundreds or even thousands of client computers that are coupled to or in communication with the server computer 112 and that, in at least some such embodiments, each or any number of those many client computers will be potential recipients of software updates from the server computer 112.

Notwithstanding the above description, the present disclosure is intended to encompass numerous variations and other embodiments in addition to that shown and described above in relation to FIG. 1. For example, although the computer system 100 is described taking a client-server form, the present disclosure is also intended to encompass other forms and architectures of computer systems including, for example, computer systems in which multiple computers communicate with one another in a peer-to-peer manner. Also, although the above discussion particularly envisions that software updates (or installation packages) can be provided from the server computer 112 to the client computers 104, 106, 108, and 110, the present disclosure is intended to encompass other embodiments or implementations in which other types of information or data instead of (or in addition to) software updates is or are provided from a server computer to one or more client computers, or between or among multiple computers.

Additionally, the present disclosure is intended to encompass numerous embodiments of computers, and any one or more of the computers 104, 106, 108, 110, and 112 can take any of a variety of forms. In some embodiments, the computers 104, 106, 108, 110, and 112 need not all take the same form, but rather different one(s) of those computers can take different forms from one another. For example, in one embodiment, the server computer 112 can take a first form, and the client computers 104, 106, 108, and 110 can take one or more other forms. As already mentioned, further for example, the server computer 112 can include multiple computers (rather than merely a single computer). In some such embodiments, the different server computers respectively can handle different types of requests from client computers such as the client computers 104, 106, 108, and 110. Also for example, each of the client computers 104, 106, 108, and 110 can take the form of a personal computer or mobile device equipped with a browser program that facilitates accessing/communication with the server computer 112.

Figure 2:
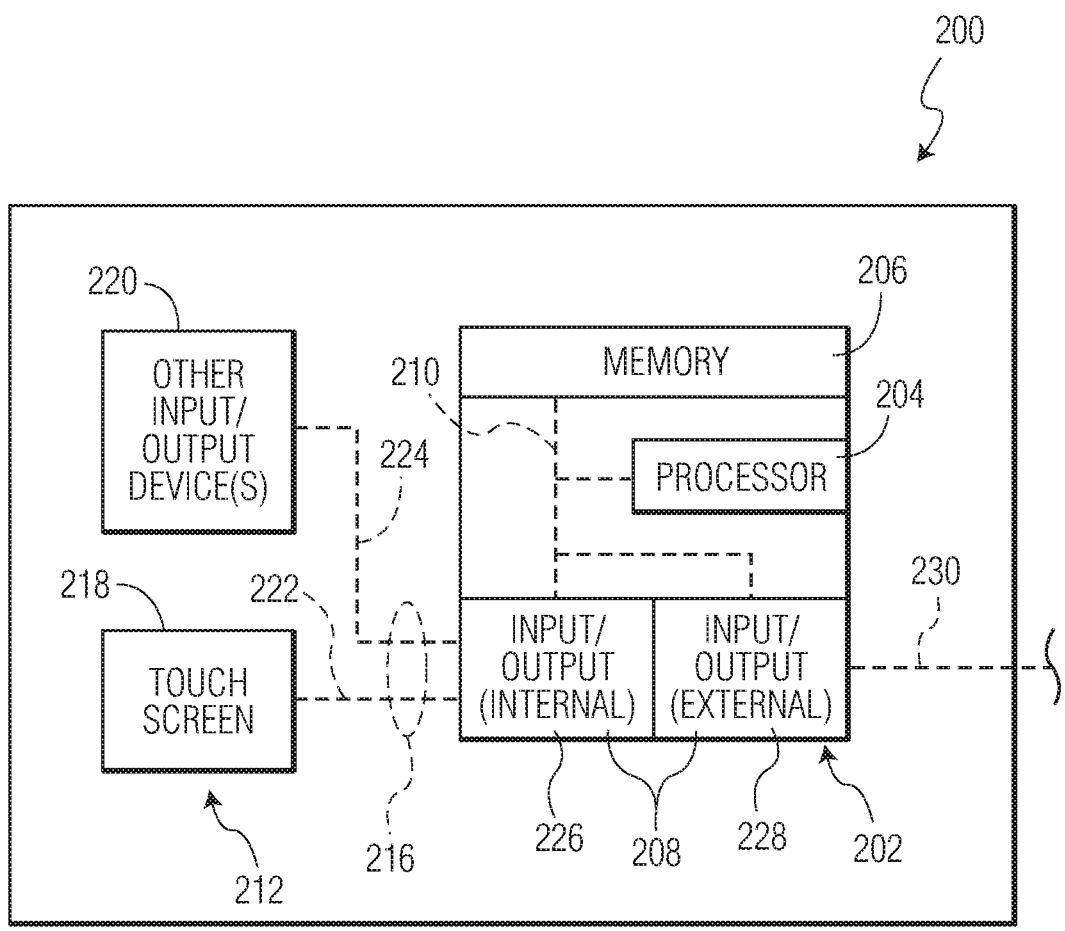
FIG. 2 is a block diagram showing in detail example components of any one or more of several computers included in the computer system of FIG. 1.

Turning to FIG. 2, a block diagram is provided to illustrate example components of a computer 200. It should be appreciated that, in at least some embodiments, each of the first, second, third, and fourth client computers 104, 106, 108, and 110 of FIG. 1, as well as the server computer 112 of FIG. 1, can take the form of the computer 200. That is, the computer 200 is intended to be representative of at least one embodiment of each of the first, second, third, and fourth client computers 104, 106, 108, and 110 as well as the server computer 112. Again, however, it should be appreciated that the computer 200 is merely an example computer and the components shown as being included in the computer 200 are merely example components.

In the representation of FIG. 2, the computer 200 is shown to have a central portion 202 that includes each of a processor 204, a memory 206, and one or more input/output port(s) 208. Each of the processor 204, the memory 206, and the one or more input/output port(s) 208 are in communication with one another, directly or indirectly, by way of one or more internal communication link(s) 210, which can include wired or wireless links depending upon the embodiment. In at least some such embodiments, the internal communication link(s) 210 can take the form of a bus.

More particularly with respect to the processor 204, it should be appreciated that the processor 204 is intended to be representative of the presence of any one or more processors or processing devices, of any of a variety of forms. For example, the processor 204 is intended to be representative of any one or more of a microprocessor, a central processing unit (CPU), a controller, a microcontroller unit, an application-specific integrated circuit (ASIC), an application-specific instruction-set processor (ASIP), a graphics processing unit (GPU), a digital signal processor (DSP), a field programmable gate array (FPGA), a programmable logic device (PLD), a physics processing unit (PPU), a reduced instruction-set computer (RISC), or the like, or any combination thereof. The processor 204 can be configured to execute program instructions including, for example, instructions provided via software, firmware, operating systems, applications, or programs, and can be configured for performing any of a variety of processing, computational, control, or monitoring functions.

Further, the memory 206 of FIG. 2 is intended to be representative of the presence of any one or more memory or storage devices, which can be employed to store or record computer program instructions (e.g., those of an operating system or application), data, or information of any of a variety of types. In accordance with the present disclosure, such memory or storage devices can particularly be employed to store any of a variety of types of software programming, applications, operating systems, data, or other information. Depending upon the embodiment, the memory 206 can include any one or more of a variety of types of devices or components (or systems) or forms of computer-readable media such as, for example, mass storage devices, removable storage devices, hard drives, magnetic disks, optical disks, solid-state drives, floppy disks, flash drives, optical disks, memory cards, zip disks, magnetic tape, volatile read-and-write memory, random access memory (RAM) (e.g., dynamic RAM (DRAM) or static RAM (SRAM), etc.), or read-only memory (ROM) (e.g., erasable or electrically-erasable programmable ROM (EPROM or EEPROM), etc.).

Although the computer 200 is shown in FIG. 2 as including the memory 206 as part of the computer, the present disclosure is also intended to encompass embodiments in which the memory 206 operates in combination with, or is replaced by, one or more remote memory devices. Such remote memory devices can include, for example, a cloud platform such as a public or private cloud. Further, even though the computer 200 is shown as including the processor 204, in other embodiments the computer can also communicate and interact with remote processing devices that can provide additional computational or other processing resources. Also, in some embodiments, the memory 206 and processor 204 can be integrated in a single device (e.g., a processor-in-memory (PIM)).

Additionally, in the representation provided in FIG. 2, the computer 200 is shown to include input/output devices 212 that are coupled to, for communication with, the central portion 202 by way of communication link(s) 216. In the present example embodiment, the input/output devices 212 include a touch screen 218 and one or more other input/output devices 220, and the communication links 216 include a first link 222 coupling the touch screen 218 with the central portion 202 and a second link 224 coupling the one or more other input/output devices 220 with the central portion. However, the input/output devices 212 shown in FIG. 2 are merely intended to serve as examples, and the present disclosure is intended to encompass numerous other embodiments of computers having any of a variety of different types, and numbers, of input/output devices including, for example, a keyboard, a mouse, a speaker, a microphone, or a monitor or other display, a temperature sensor, a vibration device, etc.

Further with respect to FIG. 2, the input/output ports 208 are shown to include each of internal input/output ports 226, by which the central portion 202 of the computer 200 is coupled to the input/output devices 212, as well as external input/output ports 228, which permit or facilitate communications between the computer 200 and one or more computers, computer systems, computer system components (not shown in FIG. 2). The internal input/output ports 226 particularly can be coupled to the input/output devices 212 by way of the communication links 216. Also, the external input/output ports 228 permit or facilitate communications between the computer 200 and other systems or devices (including remotely-located systems or devices) by way of one or more communication links 230, which can be wireless or wired communication links. For example, if one supposes that the computer 200 is any of the client computers 104 106, 108, and 110, the external input/output ports 228 can allow for and facilitate communications between the computer 200 and the server computer 112 (or vice versa) by way of one or more of the communication links 114, 116, 118, and 120 described above in regard to FIG. 1, which in such example can constitute one or more of the communication links 230.

It should be appreciated that the external input/output ports 228 can include, depending upon the embodiment, one or more devices, such as one or more wireless transceivers or transponders, by which wireless communications can occur between the computer 200 and remote computer, computer systems, or computer system components, or other remote systems or devices, via the communication link(s) 230. Also, each of the internal input/output ports 226 and the external input/output ports 228 can be configured to suit the particular systems or devices with which those input/output devices are intended to communicate, and/or the communication link(s) by which such communication will take place.

For example, the number and configuration of the internal input/output ports 226 can be suited to allow for appropriate communications between the central portion 202 and the input/output devices 212 that are particularly coupled to those internal input/output ports.

It should be appreciated that the computer 200 can take the form of, or be considered, a general purpose computer or a special purpose computer depending upon the embodiment. It can take any of a variety of forms including, for example, a personal computer, a desktop computer, or a user terminal, as well as any of a variety of types of mobile devices such as a smart phone, laptop computer, a tablet, a wearable, a personal digital assistant (PDA), etc. Although in one embodiment the computer system 100 can be a security operations center computer system, which for example can be associated with a facility or enterprise, the present disclosure is intended to encompass computer systems that are, or that include one or more computers that are, provided or supported in vehicles or other systems.

Figure 3:
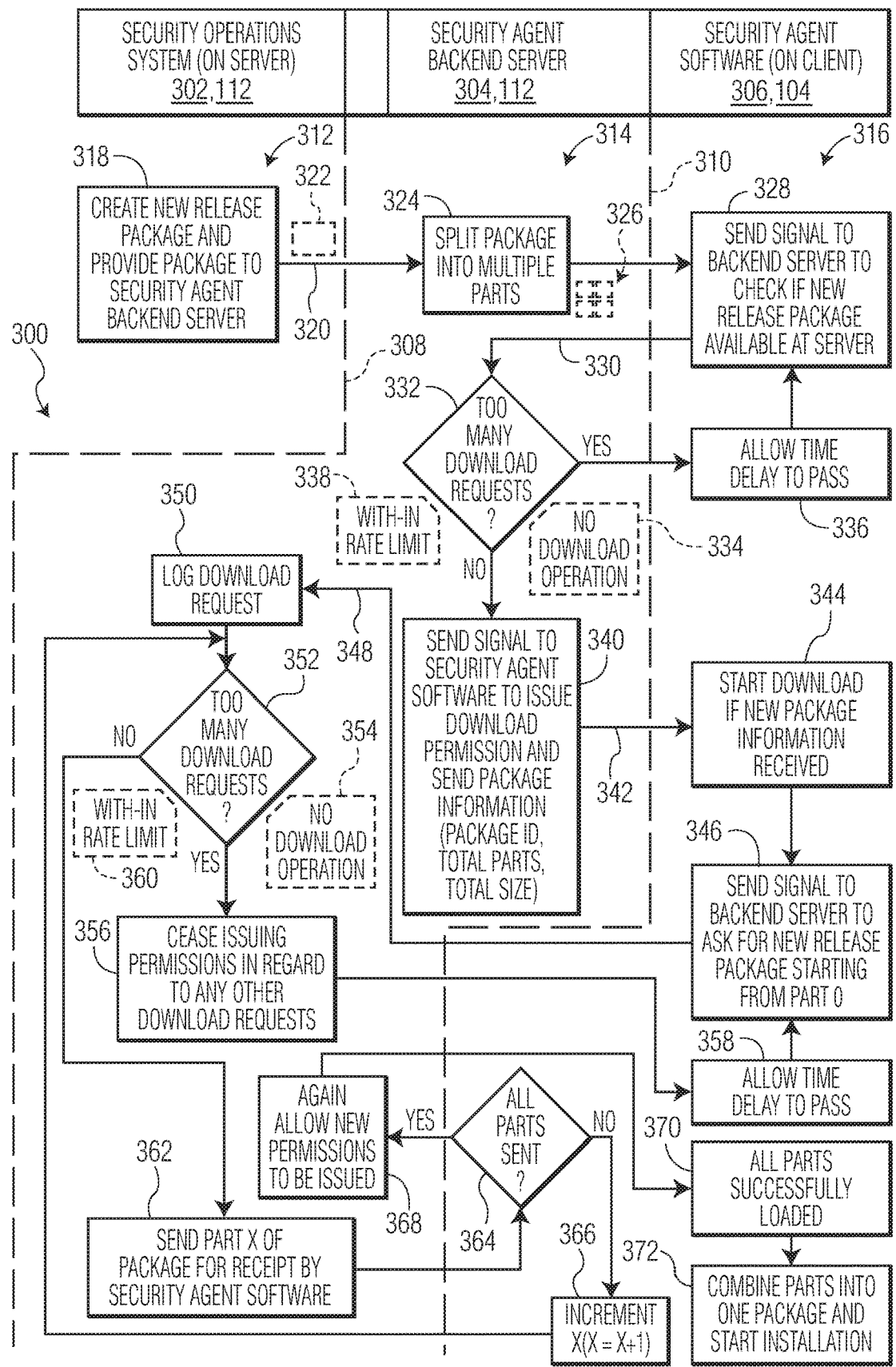
FIG. 3 is a flow chart illustrating an improved method of downloading software update information as can be performed by way of the computer system of FIG. 1, in accordance with an example embodiment encompassed herein.

Turning to FIG. 3, in accordance with the present embodiment, the computer system 100 described in relation to FIG. 1 is configured to perform an improved method or process of downloading software update information as illustrated by a flow chart (or flow diagram) 300. The flow chart 300 particularly shows exemplary steps of a method or process for downloading software updates from the server computer 112 to any of the client computers 104, 106, 108, and 110. The flow chart 300 particularly shows the method as including steps or operations performed by three actors (or entities) that are associated with the computer system 100 and that interact with one another, namely, a security operations system 302, a security agent backend server 304, and a security agent (or security agent software) 306. A step performed by the security operations system 302 is shown in a first region 312 generally to the left of a first dashed line 308 (as shown in FIG. 3), steps performed by the security agent backend server 304 are shown in a second region 314 that is generally to the right of the first dashed line 308 and to the left of a second dashed line 310 (as shown in FIG. 3), and steps performed by the security agent 306 are shown in a third region 316 that is generally to the right of the second dashed line 310 (as shown in FIG. 3).

More particularly, the security operations system 302 and the security agent backend server 304 can be considered two different processes or applications that are performed or run independently (or substantially independently) from one another on the server computer 112 of FIG. 1. Alternatively, the security operations system 302 and the security agent backend server 304 can be considered two different processes or applications that are performed or run independently (or substantially independently) on respective different computers encompassed by the server computer 112. As for the security agent 306, this can be considered a process or application that is performed or run on any one or more client computers such as any one or more of the client computer systems 104, 106, 108, and 110 of FIG. 1, independently or substantially independently, and/or simultaneously or substantially simultaneously. That is, the security agent 306 can be software that (e.g., in separate instances) is implemented and run on the first client computer 104, also independently implemented and run on the second client computer 106, also independently implemented and run on the third client computer 108, and also independently implemented and run on the fourth client computer 110.

Although the security agent 306 (e.g., in separate instances) can be implemented and run on each of the different ones of the client computers 104, 106, 108, and 110, for purposes of the present explanation concerning FIG. 3 it will be assumed that the security agent 306 is associated with a particular one of the client computers 104, 106, 108, and 110, namely, the first client computer 104. Thus, for purposes of the present explanation, the flow chart 300 particularly illustrates a process involving steps performed by the security operations system 302 associated with the server computer 112, the security agent backend server 304 also associated with the server computer 112, and the security agent 306 (e.g., an instance of the security agent software) associated with the first client computer 104. Therefore, for purposes of the present explanation, the flow chart 300 particularly concerns interactions involving the server computer 112 and the first client computer 104.

In view of the above discussion, it will be appreciated that the computer system 100 of FIG. 1 in practice can and typically will perform the method or process of FIG. 3 multiple times simultaneously, with the multiple instances of the security agent 306 corresponding to different ones of the client computers (e.g., the client computers 104, 106, 108, and 110) simultaneously interacting with the security operations system 302 and security agent backend server 304 of the server computer 112. Such multiple simultaneous or substantially simultaneous (or concurrent) performances of the method of FIG. 3 in relation to the different instances of the security agent associated with the different client computers can be considered different instances of the method of FIG. 3. Although the discussion below particularly concerns a first instance of the method of FIG. 3 involving the instance of the security agent 306 associated with the first client computer 104, it should be understood that this discussion is equally applicable to other instances of the method of FIG. 3 that can involve other instances of the security agent associated with other client computers (e.g., the client computers 106, 108, and 110).

Further, it will be appreciated from the additional discussion below regarding FIG. 3 that the operation of the first instance of the method of FIG. 3 involving the security agent 306 of the first client computer 104 can impact the operation of other instances of the method of FIG. 3 involving other security agents of other client computers (e.g., the client computers 106, 108, and 110), and vice-versa. In other words, operation of the security operations system 302 and security agent backend server 304 (especially the security agent backend server) relative to the security agent 306 on a particular one of the client computers such as the first client computer 104 can and typically will, in the present embodiment, take into account (or be influenced by) the behavior of other security agents associated with other ones of the client computers such as the client computers 106, 108, and 110. Thus, although the discussion below regarding the method of FIG. 3 pertains to a first instance of that method involving the security agent 306 of the first client computer 104, this discussion also envisions the concurrent or substantially concurrent execution of multiple instances of that method involving multiple security agent instances associated with multiple client computers, as well as operations of those multiple instances of the method of FIG. 3 that influence or impact one another.

Still referring to FIG. 3, the improved method of downloading software update information commences at a first step 318 of the flow chart 300, at which a new release package is created by the security operations system 302 and transmitted to the security agent backend server 304. Transmission of the new release package is represented by an arrow 320, and for illustration purposes the new release package is figuratively represented by a dashed box 322 alongside the arrow 320. Although referred to as a new release package, it should be appreciated that the new release package constitutes, and can be referred to as, a software update, and also as an installation package. Additionally as shown, when the new release package is received at the security agent backend server 304, then that package is split by the backend server into multiple parts at a step 324. The parts of the new release package are figuratively represented in FIG. 3 by a set of dashed boxes 326, each of which is smaller than the dashed box 322.

Next, at a step 328, the security agent 306 associated with the first client computer 104 sends a signal to the security agent backend server 304 associated with the server computer 112 to check if a new release package has become available at the backend server, as represented by an arrow 330. The sending of such a signal by the security agent 306 associated with the first client computer 104 can occur on a periodic or regular basis, or can be prompted by some other event. It will be appreciated in view of the preceding discussion that, in practice, the server computer 112 of the computer system 100 will be receiving numerous such check signals from multiple security agents associated with multiple other client computers such as the client computers 106, 108, and 110, and not merely from the first client computer 104 as in FIG. 3.

In response to receiving the signal from the security agent 306 as sent at the step 328, then at a step 332 the security agent backend server 304 makes a determination as to whether too many download requests or inquiries have been (or are being) received from different security agents associated with different ones of the client computers 102 at one time, e.g., received from too many different ones of the client computers 102 substantially simultaneously or in close temporal proximity with one another.

If it is determined at the step 332 by the security agent backend server 304 that there have been too many download requests, then the backend server refrains from providing a download permission signal to the security agent 306 of the first client computer 104 and no downloading operation occurs, as represented by a dashed box 334. Further, in this circumstance, the method then proceeds to a step 336, at which the security agent 306 waits for a predetermined time delay to pass before returning to the step 328. Upon the passing of the predetermined time delay, then the security agent 328 can again perform the step 328 and send another signal for receipt by the security agent backend server 304 inquiring about the availability of a new release package.

Alternatively, if it is determined at the step 332 that there have not been too many download requests, this is tantamount to a determination that the rate of download requests made by the security agents of any one or more of the client computers 102 is within a rate limit or is not excessive (e.g., is less than, or less than or equal to, a rate limit), as represented by a dashed box 338. If this is the case, then the method advances from the step 332 to a step 340, in which the security agent backend server 304 sends a signal back to the security agent 306 associated with the first client computer 104 to issue a download permission to that security agent, as represented by an arrow 342. In this circumstance the signal sent by the security agent backend server 304 to the security agent 306 not only involves the issuing of the download permission, but also provides and package information concerning the new release package. This package information can include, for example, a package identifier or package identification (package ID), a total parts number of package parts (e.g., in view of the splitting of the package at the step 324, and a total size of the package.

Upon the signal including the download permission being successfully communicated from the security agent backend server 304 to the security agent 306, then the method advances to a step 344, at which a downloading process is begun. Upon the download process being started, then at a step 346 the security agent 306 of the first client computer 104 sends an additional signal, as represented by an arrow 348, to the security agent backend server 304. This additional signal (represented by the arrow 348) constitutes a request for part X of the new release package, starting from the first part where X=0 (in this example, Part 0). Upon receiving this additional signal, the security agent backend server 304 logs the download request, at a step 350.

After the download request has been logged at the step 350, then the security agent backend server 304 at a step 352 makes an additional determination as to whether there are now (or recently have been) too many download requests, particularly in view of the logging of the download request at the step 350. This additional determination can particularly be made based upon whether the number of requests for downloading of the new release package, or parts thereof, from different ones of the client computers 102 that have been received recently (e.g., substantially simultaneously or in close temporal proximity with one another) exceeds a rate limit. In this circumstance, the rate limit can particularly constitute a maximum number of downloads of the new release package, or parts thereof, that can be performed (or performed reliably) given system constraints (e.g., system bandwidth, etc.). The number of download requests based upon which the additional determination at the step 352 is made can be, but often is not the same as, the number of download requests (or inquiries) considered at the step 332.

If it is determined that there are now (or recently have been) too many download requests, then as represented by a dashed box 354 the security agent backend server 304 refrains from performing the requested download of any package part (e.g., the first part, or Part 0) to the security agent 306 of the first client computer 104. The method then proceeds to a step 356, according to which the security agent backend server 304 ceases issuing any new permissions in regard to any other download requests, such as those made by security agents of other ones of the client computers such as the second, third, and fourth client computers 106, 108, and 110. Additionally, upon completion of the step 356 (or possibly simultaneously with the performing of the step 356), the method also advances to the step 358. At the step 358, the security agent 306 of the first client computer 104 waits for a predetermined time delay (which can be the same or different from the time delay of the step 336) to pass before returning to the step 346. Upon the passing of the predetermined time delay, then the security agent 306 can again perform the step 346 and send another signal for receipt by the security agent backend server 304 requesting the new release package (or part thereof).

Further in regard to the step 356, it should be appreciated that (as already described above) multiple instances of the method shown in FIG. 3 often will be performed simultaneously or substantially simultaneously by the server computer 102 in relation to different instances of the security agent 306 operating on different ones of the client computers. Although the present description is focused upon a first instance of the method of FIG. 3 involving the security agent 306 of the first client computer 104, the execution of the step 356 by this first instance of the method of FIG. 3 can affect the operation of one or more other instances of the method of FIG. 3 involving one or more other instances of the security agent 306 operating on one or more others of the client computers (e.g., the second, third, or fourth client computers 106, 108, and 110). More particularly, the execution of the step 356 in this first instance of the method 300 (involving the security agent 306 of the client computer 104) causes determinations to be made, at counterpart instances of the step 332 in counterpart instances of the method 300, that there are (or have been) too many download requests. Accordingly, the grants of permissions that might otherwise occur during the step 340 in those counterpart instances of the method 300 are avoided. Thus, the execution of the step 356 of this first instance of the method of FIG. 3 involving the security agent 306 of the first computer 104 impacts other instances of that method involving the security agents of other client computers (e.g., computers 106, 108, or 110).

Alternatively, if at the step 352 it is determined that there are not too many download requests, this is tantamount to a determination that the rate of download requests made by the security agents of any one or more of the client computers 102 is within a rate limit or is not excessive (e.g., is less than, or less than or equal to, a rate limit), as represented by a dashed box 360. As already noted, in this circumstance the rate limit can constitute a maximum number of downloads of the new release package, or parts thereof, that can be performed (or performed reliably) given system constraints (e.g., system bandwidth, etc.). Further, upon it being determined at the step 352 that there are not too many download requests, then the method advances to a step 362, in which a part of the new release package is sent from the backend server 304 to the security agent 306 of the first client computer 104.

As discussed above, the method of FIG. 3 entails splitting of the new release package at the step 324 and correspondingly the downloading of a new release package according to this method typically involves multiple or successive downloads of the different parts of a new release package. Accordingly, upon completion of the step 362 the method advances to a step 364, at which the security agent backend server 304 determines whether all parts of the new release package have been successfully sent to the security agent 306 of the first client computer 104. If the answer is no, then the method returns to the step 352 by way of a step 366 (which is discussed further below). At the step 352, it is again determined whether too many download requests are occurring (or have recently occurred). In this circumstance, if it is determined that there are now (or recently have been) too many download requests, then the meth I od again proceeds to the steps 356 and 358 and ultimately the steps 346, 350, and 352 can be repeated. Alternatively, if it is determined that there are not now (or have not recently been) too many download requests, then the method again performs the steps 362 and 364. The number of download requests based upon which the additional determination at the step 352 is made can be, but typically is not the same as, the number of download requests (or inquiries) that is considered at other times that the step 352 is performed (or as is considered at the step 332).

In the present embodiment, in proceeding to the step 352, a request part number value X ascribed by the security agent 306 of the first client computer 104 (which was transmitted at the step 346) is incremented by the security agent 306, at a step 366, e.g., X=X+1. The step 366 is performed to account for the successful transmission of the preceding part of the new release package at the step 362. For example, if the signal sent at the step 346 concerned a first part of the new release package for which the ascribed part number was 0 (X=0), then when the step 366 is performed for the first time subsequent to the performing of the step 346, the ascribed part number will be increased to 1 (X=1). Correspondingly, upon it being subsequently determined at the step 352 that there are not too many downloads such that the step 362 is performed an additional time, the security agent backend server 304 when again performing the step 362 will send to the security agent 306 of the first client computer 104 a next part (Part 1, rather than Part 0) of the new package, which has not previously been transmitted.

It will be appreciated that the steps 362, 364, 366, and 352 can be performed repeatedly so long as all parts of the new release package have not been downloaded during the step 362. In each successive looping through the steps 362, 364, 366, and 352, the ascribed part number will be incremented at each successive performance of the step 366 (e.g., following X=0 and X=1, X can then take on values of 2, 3, etc.) and correspondingly at each successive performance of the step 362 a part of the new release package corresponding to that incremented part number will be sent to the security agent 306 of the first client computer 104.

It should further be appreciated that, if at any time it is determined that there are (or have recently been) too many downloads at the step 352 such that the process instead advances to the steps 356, 358, and 346, then in such circumstance the security agent 306 retains (e.g., stores) the most recent value of the ascribed part number, as may have been incremented by the step 366. Accordingly, when the security agent 306 of the first client computer 104 ultimately performs again the step 346 requesting downloading of the new release package and that request is downloaded at the step 350, then upon it being additionally determined at the step 352 that there are not too many download requests such that the method returns to the step 362, the security agent backend 304 will be apprised as to which part of the new release package is appropriate to be sent during that performance of the step 362. That is, in such a circumstance, the security agent backend server 304 will be able to determine based upon the currently-stored part number value X (e.g., as stored at the security agent 306 and reported to the security agent backend server 304 by that security agent as part of the signal sent at the step 346, as represented by the arrow 348) how much of the new release package has previously been sent to the security agent 306. Thus, when again performing the step 362, the security agent backend server 304 will send to the security agent 306 an additional part of the new release package that has not previously been sent, as indicated by the part number value X.

Again with respect to the step 364, after all of the parts of the new release package have been sent, the downloading of the new release package can be considered complete. In such a circumstance, it may be the case that more bandwidth for sending new release packages is now available by which other packages can be sent, for example, to others of the client computers (e.g., the second, third, or fourth client computers 106, 108, or 110). Therefore, to the extent the security agent backend server 304 may have ceased issuing permissions in the past (e.g., per the step 356 discussed above), this policy need no longer be maintained. Accordingly, in at least some circumstances, the determination at the step 364 that all parts of the new release package have been sent is followed by the performing of a step 368, at which the security agent backend server 304 again allows new download permissions to be issued. Again, as discussed in regard to the step 356, the performing of the step 368 particularly can influence the performing of the step 332 and the step 340 in other instances of the method of FIG. 3 being performed in relation to other instances of the security agents associated with other client computers (e.g., the client computers 106, 108, and 110). In one or more of such other instances of the method of FIG. 3, for example, it can be determined at the step 332 that there are not any longer too many download requests, such that download permissions can be granted at the step 340 to such other security agents associated with such other client computers.

Following the performing of the step 368 (or alternatively simultaneous with, or instead of, the performing of the step 368), the method of FIG. 3 then advances to a step 370 and finally to a step 372. At the step 370, the security agent 306 of the first client computer 104 loads, or determines that all parts of the new release package have been successfully loaded, onto or in relation to that security agent or client computer. Finally, at the step 372, all of the parts of the new release package that have been received and loaded are combined into a single package, and installation of that package in relation to the security agent 306 or the first client computer 104 (or possibly in relation to some other entity or device associated therewith) commences.

In view of the above discussion, it should further be appreciated that method of FIG. 3 can be viewed as entailing two programs or applications. Also, the method can be viewed as including or employing in at least some embodiments two different programs, applications, or application programming interfaces (APIs) that are operating at or by the security agent backend server 304 or the server computer 112, particularly in relation to the security agent 306 or the first client computer 104 (alternatively, or additionally the method can be viewed as including or employing two different programs, applications, or APIs that are operating or by the security agent 306 or the first client computer 104). In at least some embodiments, the two APIs can reside at the security agent backend server 304 on the server computer 112, and the two APIs be called by the security agent 306 residing on the first client computer 104 (and/or on one or more of the client computers, such as any of the client computers 106, 108, or 110).

More particularly in this regard, the steps of the method of FIG. 3 that relate to inquiring about the availability of a new release package and obtaining downloading permission concerning that new release package can be viewed as involving a first API (API-1, which can be referred to a "/selfupgrade/meta" API). In particular, the steps 332 and 340 of FIG. 3, concerning checking whether a new release package is available, determining whether there are too many download requests, and (if not too many download requests) providing downloading permission as well as package information (e.g., package id, total parts, and package size information) can be considered steps of the first API.

Additionally, the steps of the method of FIG. 3 that relate to requesting and performing the downloading of the new release package after the granting of downloading permission can be viewed as involving a second API (API-2, which can be referred to as a "/selfupgrade/package/{package_id}?partnumber={part_number}" API). In particular, the steps 350, 352, 356, 362, 364, 366, and 368 of FIG. 3, concerning logging download requests, determining whether there are too many download requests, (if not too many download requests) conducting the downloading of the parts of the new release package, and the cessation or restarting of the sending of new download permissions can be considered steps of the second API. By virtue of calling the first and second APIs, a given agent such as the security agent 306 of the first client computer 104 can communicate with the security agent backend server 304, download all parts of the new release package. Then, after all of the parts of the new release package are successfully downloaded, the agent will combine the parts into one package and start the installation process.

It should further be understood that operation in accordance with the method of FIG. 3 can be viewed as entailing double-gated rate limit control. During new release deployment, package downloading will take most of the bandwidth on the server side. In view of this consideration, the portions of the method of FIG. 3 associated with the downloading of parts of the new release package can serve a first role involving the application of one gate limit (e.g., as considered at the step 352) to control the download rate and bandwidth usage. More particularly, the steps 344, 346, 350, 352, 356, 358, 362, 364, 368, 370, and 372 of the method of FIG. 3, which correspond to operation of or in relation to the second API (API-2) described above, permit such control over the download rate and bandwidth usage. Nevertheless, it is also appropriate to consider the steps 328, 332, 336, and 340, which correspond to operation of or in relation to the first API (API-1), as serving a second role that involves the application of another gate limit (e.g., as considered at the step 332) to governs or restrict downloads. Indeed, the steps associated with the first API (API-1) serve as a gatekeeper for issuing download permissions, in contrast to the steps associated with the second API (API-2), which serve as a gatekeeper for executing the download.

It will be appreciated that, in at least some embodiments described above involving the first and second APIs, only those of the security agents 306 associated with the client computers 102 that have received download permission via the first API (API-1) will call the second API (API-2) for downloading. Further, when the second API (API-2) receives too many requests, the second API (API-2) will inform the first API (API-1) to stop issuing permissions. Additionally, after all of the security agents with permissions have finished the downloading of all parts of the new release package, the second API (API-2) will inform the first API (API-1) to start issuing permissions again.

In view of the above discussion, it should be appreciated that one or more advantages can be achieved by way of embodiments disclosed or encompassed herein. In particular, in at least some embodiments, the downloading of new release packages to multiple client computers (and security agents associated therewith) in a more efficient or effective manner that makes better use of available bandwidth. By dividing new release packages into multiple parts, decisions can be made by the system during the downloading of a new release package to proceed with downloading, or to defer the downloading, of successive parts, to any given client computer(s) depending upon bandwidth and depending upon how many other client computer(s) are currently engaging in downloading activity. Incremental control of downloading can therefore be achieved. Further, by providing a mechanism involving double-gated rate limit control, the system can prevent other downloading activity with respect to other client computer(s) that have not yet begun the process of downloading, by taking action to limit the granting of downloading permissions to such additional client computer(s).

As already discussed above, the present disclosure is intended to encompass a variety of improved methods of downloading software updates or programming information as well as other types of information or data (e.g., as installation packages). Also, the present disclosure is intended to encompass a variety of larger methods that include, as parts of those methods, the performing of downloading in accordance with any of the improved methods described herein. Further, it should be appreciated that, although the flowchart description provided with the present disclosure (e.g., in FIG. 3) illustrates processes and process steps (or operations) that can be performed by one or more systems or devices according to some embodiments encompassed by the present disclosure, the present disclosure is intended to encompass modified versions of these processes and process steps (or operations).

For example, in some other embodiments encompassed herein, one or more of the steps of the method shown in FIG. 3 can be performed in different orders than that shown, in inverted orders relative to what is shown, or at different relative times that what is be described above. Further for example, even if two process steps are described above as occurring at different times, the present disclosure is intended to encompass other embodiments in which those process steps occur simultaneously, or vice-versa. Further, the present disclosure is intended to encompass embodiments in which one or more other operations may be added or omitted relative to the processes described above. Additionally, the present disclosure is intended to encompass embodiments in which some steps or portions of the method described herein are performed even though other steps or portions are not performed. For example in another embodiment encompassed herein, aspects or steps of the method of FIG. 3 described above as involving a second API can be performed even though aspects or steps of the method of FIG. 3 described above as involving a first API are not performed.

Additionally, although the present disclosure includes and encompasses numerous other embodiments, implementations, and applications of systems, in addition to those described above. Although the present disclosure envisions embodiments and applications that employ computer systems acting in accordance with a client-server model, the present disclosure is also intended to encompass other arrangements (e.g., peer-to-peer computer system or cloud system arrangements). Further, although the present disclosure encompasses embodiments involving APIs, the present disclosure also encompasses embodiments that do not employ APIs or that employ other forms of programs, applications, or software. Additionally, although the present disclosure describes embodiments relating to a security operations center, the present disclosure is also intended to be applicable to other embodiments, applications, or environments.

While the principles of the invention have been described above in connection with specific apparatus and method, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A method of downloading software information, the method comprising;
   receiving, at a server computer, a first inquiry signal from a first client computer of a plurality of client computers, wherein the first inquiry signal comprises a first availability inquiry regarding whether a particular software package is located at the server computer and is available to be downloaded;
   performing a first determination as to whether a first number of download requests for the particular software package received by the server computer from the plurality of client computers exceeds a first limit, wherein the first limit is a maximum number of downloads supported for the particular software package;
   in response to determining, based on the first determination, that the first number of download requests for the particular software package do not exceed the first limit, sending a second signal for receipt by the first client computer, the second signal including a first permission to download the particular software package and software package information, wherein the software package information includes a total number of parts of the particular software package;
   in response to determining, based on the first determination, that the first number of download requests for the particular software package exceeds the first limit, not sending the second signal and allowing time to pass for any respective client computer to resend their availability inquiry;
   receiving, at the server computer, a first download signal arriving from the first client computer, the first download signal including a first download request to download a first part of the particular software package;
   performing, in response to receiving the first download signal, a second determination as to whether a second number of download requests for the particular software package received by the server computer from the plurality of client computers exceeds a second limit, wherein the second limit is a maximum number of downloads supported for the particular software package;
   in response to determining, based on the second determination, that the second number of download requests for the particular software package does not exceed the second limit, sending the first part of the particular software package for receipt by the first client computer,
   in response to determining, based on the second determination, that the second number of download requests for the particular software package exceeds the second limit, ceasing to issue download permissions for any future download requests until the download request submitted in response to the second signal is processed; and
   whereby, due to the performing of the first and second determinations, double-gated control is exercised in relation to the downloading of the software information including the first part of the particular software package.

2. The method of claim 1, further comprising splitting the particular software package into a plurality of parts including the first part.

3. The method of claim 2, wherein the particular software package is a new release package intended for installation on the plurality of client computers.

4. The method of claim 3, wherein the first inquiry signal and the first download signal are received from agent software operating on the first client computer.

5. The method of claim 4, wherein the new release package is received from a security operations system and the agent software operating on the first client computer from which the first inquiry signal and the first download signals are received is security agent software.

6. The method of claim 2, further comprising performing a third determination of whether all of the parts of the plurality of parts have been sent for receipt by the first client computer after the sending of the first part.

7. The method of claim 6, further comprising sending a second part for receipt by the first client computer in response to determining, under the third determination, that not all of the parts of the plurality of parts have been sent for receipt by the first client computer.

8. The method of claim 7, further comprising, in response to determining, under the third determination, that not all of the parts of the plurality of parts have been sent for receipt by the first client computer: performing a fourth determination as to whether either the first number, the second number, or a third number of download requests received by the server computer from the plurality of client computers including the first client computer exceed a third limit, wherein the third limit is a maximum number of downloads supported for the particular software package.

9. The method of claim 8, further comprising
logging the first download request at a memory device associated with the server computer in
response to the receiving of the first download signal; and
incrementing a part counter, allowing for incremental control over downloading.

10. The method of claim 8, further comprising, in response to determining, under the fourth determination, that the first number, the second number, or the third number of download requests received by the server computer from the plurality of client computers including the first client computer exceed the third limit, ceasing one or more operations of the server computer relating to additional issuances of additional permissions to download the particular software package.

11. The method of claim 6, further comprising, in response to determining, under the third determination, that all of the parts the plurality of parts have been sent for receipt by the first client computer after the sending of the first part, taking one or more steps to commence or recommence an issuing of additional permissions to download the particular software package,
wherein also the first client computer is able to combine all of the parts and begin an installation process of the particular software package.

12. The method of claim 1, further comprising, prior to the performing of the first determination: receiving, at the server computer, an additional inquiry signal from the first client computer, wherein the additional inquiry signal comprises an
additional avail ability inquiry regarding whether an additional particular software package is located at the server computer and is available to be downloaded; and
in response to determining, under an additional determination, that the first number or an additional number of download requests for the additional particular software package exceeds another limit,
taking no action in response to the additional inquiry signal to send any signal for receipt by the first client computer that includes any permission to download the additional particular software package, and
wherein a first time period elapses between the receiving of the first inquiry signal.

13. The method of claim 1, wherein the first limit and the second limit are different, and wherein, due to the performing of the first and second determinations, the double-gated control is double-gated limit control.

14. The method of claim 1, wherein the performing of the first determination and the sending of the second signal occurs in accordance with a first application programming interface (API) and the performing of the second determination and the sending of the first part occurs in accordance with a second API.

15. A method of downloading software information, the method comprising:
receiving, at a server computer, a first inquiry signal from a first client computer of a plurality of client computers, wherein the first inquiry signal comprises a first availability inquiry regarding whether a particular software package is located at the server computer and is available to be downloaded;
performing a first determination as to whether a first number of download requests for the particular software package received by the server computer from the plurality of client computers exceeds a first limit, wherein the first limit is a maximum number of downloads supported for the particular software package;
in response to determining, based on the first determination, that the first number of download requests for the particular software package do not exceed the first limit, sending a second signal for receipt by the first client computer, the second signal including a first permission to down the particular software package and software package information, wherein the software package information includes a total number of parts of the particular software package;
in response to determining, based on the first determination, that the first number of download requests for the particular software package exceeds the first limit, not sending the second signal and allowing time to pass for any respective client computer to resend their availability inquiry;
receiving, at a server computer, a first download signal arriving from the list client computer, the first download signal including a first download request to download a first part of the particular software package;
performing, in response to receiving the first download signal, a second determination as to whether a second number of download requests for the particular software package received by the server computer from the plurality of client computers exceeds a second limit, wherein the second limit is a maximum number of downloads supported for the particular software package;
in response to determining, based on the second determination, that the second number of download requests for the particular software package does not exceed the second limit, sending the first part of the software package for receipt by the first client computer,
in response to determining, based on the second determination, that the second number of download requests for the particular software package exceeds the second limit, ceasing to issue download permissions for any future download requests until the download request submitted in response to the second signal is processed; and
commencing installation of the particular software package after all of a plurality of parts of the particular software package are received by the first client computer.

16. The method of claim 15, wherein the sending of the first inquiry signal is in accordance with, or involves a first call of, a first application programming interface (API) operating on the server computer, and wherein the sending of the first download signal is in accordance with, or involves a second call of, a second API operating on the server computer.

17. The method of claim 15, wherein the downloading of the particular software package to the first client computer from the server computer is governed by a double-gated rate limit control mechanism.

18. A system for downloading software information, the system comprising:

a server computer comprising at least one processing device and at least one memory device coupled at least indirectly with the at least one processing device, wherein the server computer is configured to:

receive a first inquiry signal arriving from a first client computer, wherein the first inquiry signal comprises a first availability inquiry regarding whether a particular software package is located at the server computer and is available to be downloaded;

perform a first determination as to whether a first number of download requests for the particular software package received from a plurality of client computers including the first client computer exceeds a limit, wherein the limit is a maximum number of downloads supported for the particular software package;

in response to determining, under the first determination, that the first or download requests for the particular software package do not exceed the limit, sending a second signal for receipt by the first client computer including a first permission to download the particular software package and software package information, wherein the software package information includes a total number of parts of the particular software package;

in response to determining, based on the first determination, that the first number of download requests for the particular software package exceeds the limit, not sending the second signal and allowing time to pass for any respective client computer to resend theft availability inquiry;

receive a first download signal arriving from the first client computer, the first download signal including a first request to download a first part of the particular software package;

perform a second determination as to whether a second number of download requests for the particular software package received from the plurality of client computers, including the first client computer, exceed the limit;

in response to determining, based on the second determination, that the second number of download requests for the particular software package exceeds the limit, ceasing to issue download permissions for any future download requests until the download request submitted in response to the second signal is processed; and in response to determining, under the second determination, that the second number of download requests does not exceed the limit, send the first part of the particular software package for receipt by the first client computer, whereby, due to the performing of the first and second determinations, double-gated control is exercised in relation to the downloading of the software information including the first part of the particular software package.

19. The system of claim 18, further comprising a plurality of client computers including the first client computer, wherein each of the client computers in communication with the server computer has a respective instance of an agent software program operating thereon so that each of the client computers is able to call each of two application programming interfaces associated with the server computer to achieve the downloading of the particular software package.

* * * * *